(12) United States Patent
Ohara et al.

(10) Patent No.: US 11,419,144 B2
(45) Date of Patent: Aug. 16, 2022

(54) USER APPARATUS AND BASE STATION APPARATUS

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 113 days.

(21) Appl. No.: 16/650,136

(22) PCT Filed: Sep. 29, 2017

(86) PCT No.: PCT/JP2017/035752
§ 371 (c)(1),
(2) Date: Mar. 24, 2020

(87) PCT Pub. No.: WO2019/064603
PCT Pub. Date: Apr. 4, 2019

(65) Prior Publication Data
US 2021/0195633 A1    Jun. 24, 2021

(51) Int. Cl.
*H04W 74/02* (2009.01)
*H04W 72/04* (2009.01)
*H04W 74/00* (2009.01)
*H04W 74/08* (2009.01)

(52) U.S. Cl.
CPC ....... *H04W 74/02* (2013.01); *H04W 72/0446* (2013.01); *H04W 72/0453* (2013.01); *H04W 74/006* (2013.01); *H04W 74/0833* (2013.01)

(58) Field of Classification Search
CPC .......... H04W 74/0833; H04W 74/006; H04W 72/0446; H04W 72/0453; H04W 74/08; H04W 72/04; H04W 74/02
See application file for complete search history.

(56) References Cited

U.S. PATENT DOCUMENTS

| | | | |
|---|---|---|---|
| 2020/0137800 A1* | 4/2020 | Takahashi | H04W 74/006 |
| 2020/0154377 A1* | 5/2020 | Qian | H04W 74/006 |
| 2020/0187246 A1* | 6/2020 | Amuru | H04L 5/0053 |
| 2020/0214035 A1* | 7/2020 | Chen | H04B 7/088 |

(Continued)

OTHER PUBLICATIONS

Extended European Search Report issued in counterpart European Patent Application No. 17927680.3, dated Mar. 24, 2021 (7 pages).
(Continued)

*Primary Examiner* — Brian D Nguyen
(74) *Attorney, Agent, or Firm* — Osha Bergman Watanabe & Burton LLP

(57) ABSTRACT

A user apparatus communicates with a base station apparatus. The user apparatus includes a reception unit configured to receive, from the base station apparatus, a plurality of blocks and an indication including information specifying a part of resources used for contention-free random access, a control unit configured to identify resources used for contention-free random access based on information specifying resources that are associated with the blocks and are used for random access, and based on the information specifying a part of resources used for contention-free random access, and a transmission unit configured to transmit a preamble to the base station apparatus using the identified resources used for contention-free random access.

9 Claims, 8 Drawing Sheets

(56) References Cited

U.S. PATENT DOCUMENTS

| | | | |
|---|---|---|---|
| 2020/0221508 A1* | 7/2020 | Huang | H04W 68/005 |
| 2020/0252969 A1* | 8/2020 | Chen | H04W 36/08 |
| 2020/0260393 A1* | 8/2020 | Zhang | H04W 74/0833 |
| 2020/0351853 A1* | 11/2020 | Xiong | H04L 5/0023 |
| 2021/0144723 A1* | 5/2021 | Takahashi | H04L 5/0053 |

OTHER PUBLICATIONS

Intel Corporation; "NR RACH procedures"; 3GPP TSG RAN WG1 NR Adhoc#3, R1-1716281; Nagoya, Japan; Sep. 18-21, 2017 (6 pages).

Ericsson; "Remaining details on NR-RACH configurations and formats"; 3GPP TSG RAN WG1 NR Ad-Hoc#3, R1-1716154; Nagoya, Japan; Sep. 18-21, 2017 (21 pages).

International Search Report issued in PCT/JP2017/035752 dated Nov. 7, 2017 (4 pages).

Written Opinion of the International Searching Authority issued in PCT/JP2017/035752 dated Nov. 7, 2017 (4 pages).

ZTE; "4-step random access procedure"; 3GPP TSG RAN WG1 Meeting #90, R1-1712067; Prague, Czechia; Aug. 21-25, 2017 (16 pages).

3GPP TS 36.213 V14.3.0; "3rd Generation Partnership Project; Technical Specification Group Radio Access Network; Evolved Universal Terrestrial Radio Access (E-UTRA); Physical layer procedures (Release 14)" Jun. 2017 (460 pages).

3GPP TS 36.211 V14.3.0; "3rd Generation Partnership Project; Technical Specification Group Radio Access Network; Evolved Universal Terrestrial Radio Access (E-UTRA); Physical channels and modulation (Release 14)"; Jun. 2017 (195 pages).

\* cited by examiner

USER APPARATUS AND BASE STATION APPARATUS

BACKGROUND OF THE INVENTION

1. Field of the Invention

The present invention relates to a user apparatus and a base station apparatus in a wireless communication system.

2. Description of the Related Art

In 3GPP (3rd Generation Partnership Project), in order to realize further larger system capacity, further faster data transmission speed, further lower latency in a wireless communication section, etc., a wireless communication method called "5G" or "NR (New Radio)" has been discussed (hereinafter, the wireless communication method is referred to as "NR"). In NR, various wireless technologies have been discussed in order to meet requirements including latency equal to or less than 1 ms in a wireless section while realizing a throughput equal to or greater than 10 Gbps.

In NR, in initial access in which a user apparatus establishes a connection between the user apparatus and a base station apparatus, the user apparatus detects a cell according to a synchronization signal transmitted from the base station apparatus, identifies the cell, and obtains a part of system information necessary for the initial access (e.g., Non-Patent Document 1).

Further, in NR, it is expected that a wide range of frequencies, from a low frequency band similar to LTE (Long Term Evolution) to a frequency band that is higher than LTE, will be used. Propagation loss increases especially in a high frequency band. Therefore, in order to compensate for the propagation loss, an application of beamforming with a narrow beam width has been discussed (e.g., Non-Patent Document 2).

CITATION LIST

Non-Patent Document

[Non-Patent Document 1] 3GPP TS 36.213 V14.3.0 (2017 June)
[Non-Patent Document 2] 3GPP TS 36.211 V14.3.0 (2017 June)

SUMMARY OF THE INVENTION

Technical Problem

In NR, a synchronization signal and a part of system information, that are necessary for the initial access, are mapped to a radio frame by using a resource unit called "SS block (Synchronization Signal block)" that consists of consecutive (successive) OFDM (Orthogonal Frequency Division Multiplexing) symbols. A user apparatus obtains information necessary for the initial access by receiving the SS block transmitted from a base station apparatus. The information necessary for the initial access includes information that specifies a RACH (Random Access Channel) resource and a preamble signal format.

Further, in NR, the base station apparatus transmits multiple beams by applying the beamforming. The user apparatus receives an SS block that is associated with the beam and obtains information necessary for the initial access. RACH resources are associated with SS blocks.

Here, in the case where the RACH resources used for contention-free (non-contention based) random access are indicated to the user apparatus, there is a problem in that signaling overhead will be increased in order to indicate all of information items for specifying the RACH resources, that is, positions of the RACH resources in the time domain and the frequency domain, a preamble index, an associated CSI-RS (Channel State Information-Reference Signal), associated SS blocks, etc.

The present invention has been made in view of the above. It is an object of the present invention to efficiently indicate, to the user apparatus, resources that are used for contention-free random access in the initial access in a wireless communication system.

Solution to Problem

According to an embodiment of the present invention, a user apparatus that communicates with a base station apparatus is provided. The user apparatus includes a reception unit configured to receive, from the base station apparatus, a plurality of blocks and an indication including information specifying a part of resources used for contention-free random access, a control unit configured to identify resources used for contention-free random access based on information specifying resources that are associated with the blocks and are used for random access, and based on the information specifying a part of resources used for contention-free random access, and a transmission unit configured to transmit a preamble to the base station apparatus using the identified resources used for contention-free random access.

Advantageous Effects of Invention

According to an embodiment of the present invention, it is possible to efficiently indicate, to the user apparatus, resources that are used for contention-free random access in the initial access in a wireless communication system.

DETAILED DESCRIPTION OF THE PREFERRED EMBODIMENTS

Figure 1:
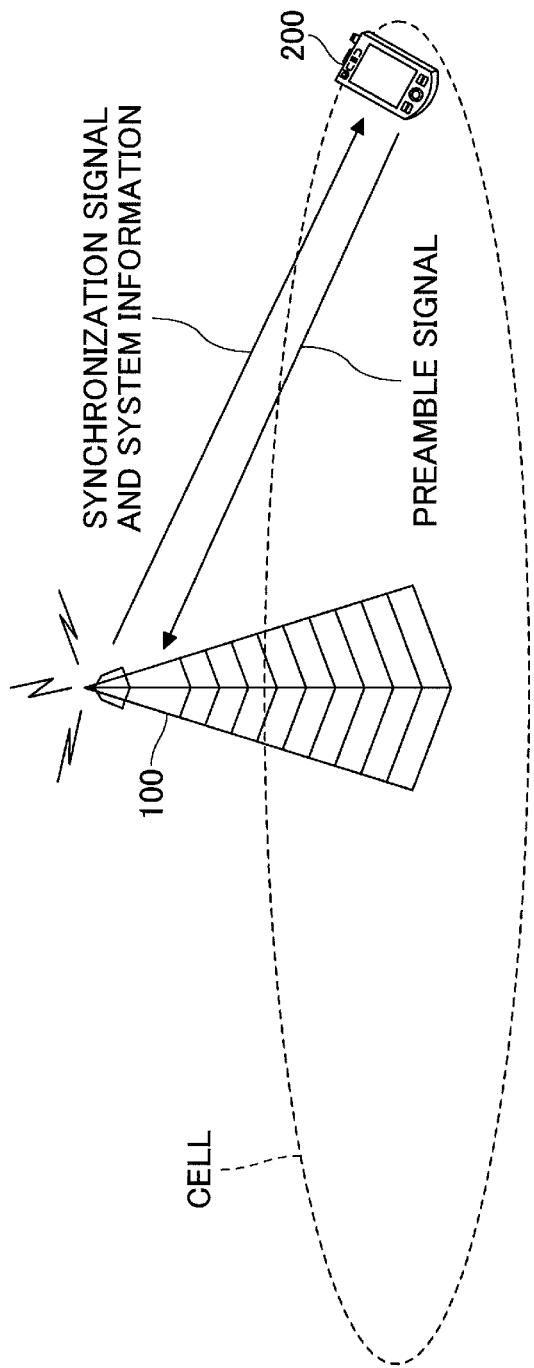
FIG. 1 is a drawing illustrating a configuration example of a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization Signal), PSS (Primary SS), SSS (Secondary SS), PBCH (Physical broadcast channel), PRACH (Physical RACH), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc.

FIG. 1 is a drawing illustrating a configuration example of a wireless communication system according to an embodiment of the present invention. As illustrated in FIG. 1, the wireless communication system includes a base station apparatus 100 and a user apparatus 200. In FIG. 1, a single base station apparatus 100 and a single user apparatus 200 are illustrated as examples. There may be a plurality of the base station apparatuses 100 and a plurality of the user apparatuses 200.

The base station apparatus 100 is a communication apparatus that provides one or more cells and performs wireless communications with the user apparatus 200. As illustrated in FIG. 1, the base station apparatus 100 transmits a synchronization signal and system information to the user apparatus 200. The synchronization signal is, for example, an NR-PSS and an NR-SSS. The system information is transmitted via, for example, a NR-PBCH. Further, the system information may be referred to as broadcast information. The base station apparatus 100 and the user apparatus 200 are enabled to transmit and receive a signal by performing the beamforming. The user apparatus 200 is a communication apparatus, that has a wireless communication function, such as a smart-phone, a mobile phone, a tablet, a wearable terminal, an M2M (Machine-to-Machine) communication module, etc. The user apparatus 200 is wirelessly connected to the base station apparatus 100, and uses various communication services provided by the wireless communication system. As illustrated in FIG. 1, in an initial access stage, the user apparatus 200 transmits a random access preamble signal to the base station apparatus 100. The random access is performed based on RMSI (Remaining minimum system information) in addition to the system information received from the base station apparatus 100 via NR-PBCH. The RMSI is system information that is received via NR-PDSCH (Physical downlink shared channel) that is scheduled according to NR-PDCCH (Physical downlink control channel). The RMSI includes, for example, information necessary for the initial access, such as a RACH setting.

It should be noted that, in an embodiment of the present invention, the duplex method may be TDD (Time Division Duplex), FDD (Frequency Division Duplex), or other methods (e.g., Flexible Duplex, or the like).

Further, in the following descriptions, "transmitting a signal by using a transmission beam" may be referred to as "transmitting a precoding-vector-multiplied signal (a signal precoded by a precoding vector)". Similarly, "receiving a signal by using a reception beam" may be referred to as "multiplying the received signal by a predetermined weight vector." Further, "transmitting a signal by using a transmission beam" may be expressed as "transmitting a signal via a specific antenna port". Similarly, "receiving a signal by using a reception beam" may be expressed as "receiving a signal via a specific antenna port." The antenna port refers to a logical antenna port or a physical antenna port defined in 3GPP standards. It should be noted that methods in which the transmission beam and the reception beam are formed are not limited to the methods described above. For example, a method may be used in which the base station apparatus 100 having plural antennas changes each of the antenna angles and the user apparatus 200 having plural antennas changes each of the antenna angles. A method in which the method of using precoding vectors and the method of changing antenna angles are combined may be used, or different antenna panels may be switched. The method of switching multiple antenna panels may be combined with other methods, or some other methods may be used. Further, for example, multiple transmission beams different from each other may be used in a high frequency band. An operation using multiple transmission beams is referred to as a "multi-beam operation", and an operation using a single transmission beam is referred to as a "single-beam operation".

Embodiment 1

In the following, an embodiment 1 will be described.

Figure 2:
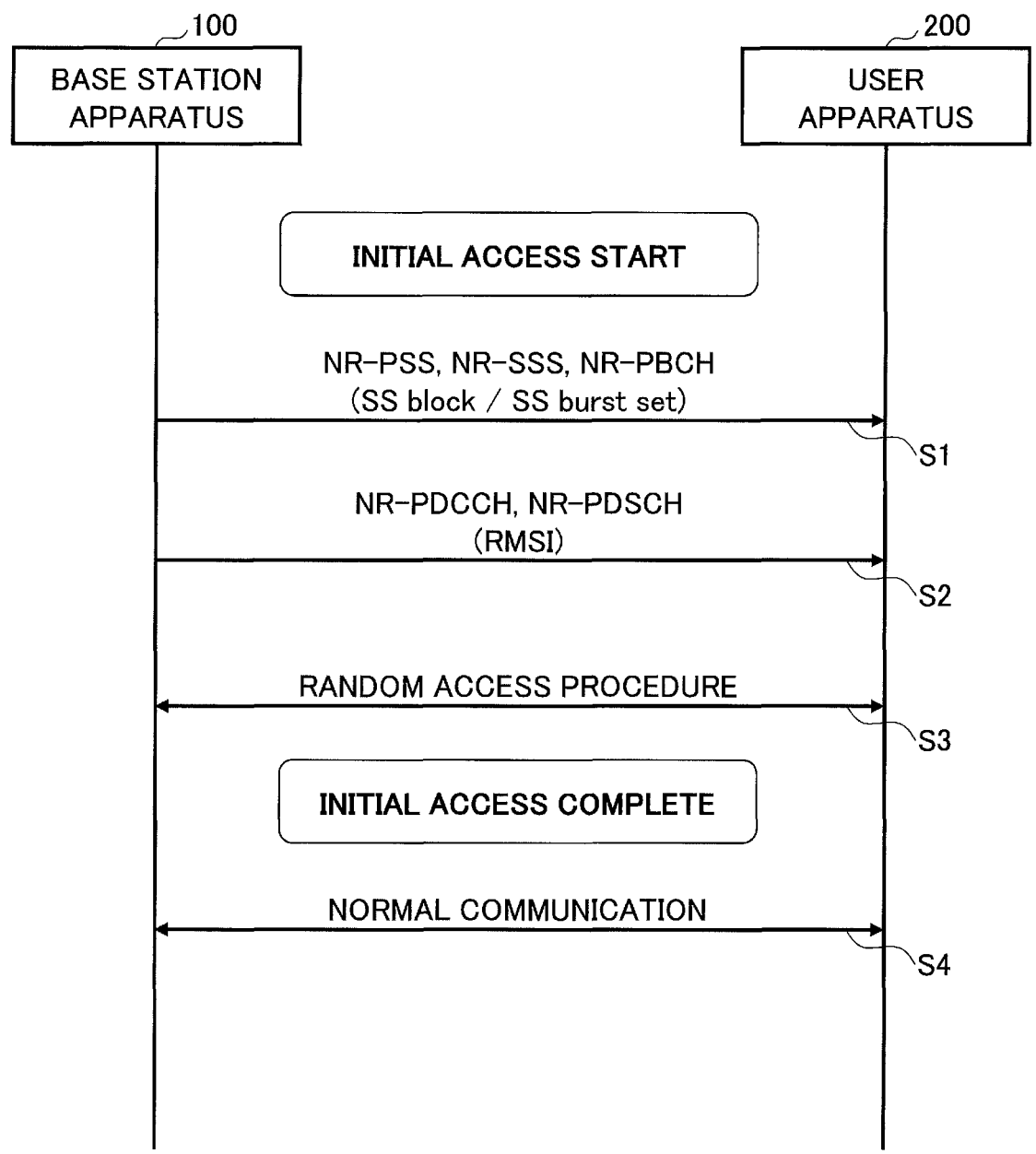
FIG. 2 is an example of an initial access sequence according to an embodiment of the present invention.

FIG. 2 is an example of an initial access sequence according to an embodiment of the present invention. When initial access is started, in step S1, the base station apparatus 100 transmits an NR-PSS, an NR-SSS, and an NR-PBCH (i.e., SS block) to the user apparatus 200. The NR-PBCH includes a part of system information. The base station apparatus 100 repeatedly transmits an SS burst set including multiple SS blocks to the user apparatus 200 at a cycle of SS burst set periodicity. In the case where multiple SS blocks are included in a SS burst set, the multiple SS blocks may be associated with corresponding different beams under the multi-beam operation environment.

With respect to the above, the user apparatus 200 receives the NR-PSS transmitted from the base station apparatus 100, and uses the NR-PSS for identifying at least a part of an initial time, a frequency synchronization, and a cell ID (identity). Further, the user apparatus 200 receives the NR-SSS transmitted from the base station apparatus 100, and uses the NR-SSS for identifying at least a part of the cell ID. Further, the user apparatus 200 obtains information used for obtaining a part of system information necessary for the initial access (e.g., a system frame number (SFN), other system information RMSI, etc.) by receiving the NR-PBCH transmitted from the base station apparatus 100.

Subsequently, in step S2, other system information including the RMSI is received via a NR-PDSCH scheduled according to the NR-PDCCH. The RMSI includes information that is used for identifying a resource for performing a random access procedure (i.e., RACH resource), a preamble index, etc.

In the case where multiple SS blocks are included in a SS burst set, upon obtaining an SS block, the user apparatus 200 starts the random access procedure by transmitting a preamble via a RACH resource that is associated with the obtained SS block (S3).

When the random access procedure between the base station apparatus 100 and the user apparatus 200 is successful in step S3, the initial access is completed and a normal communication is started (S4).

Figure 3:
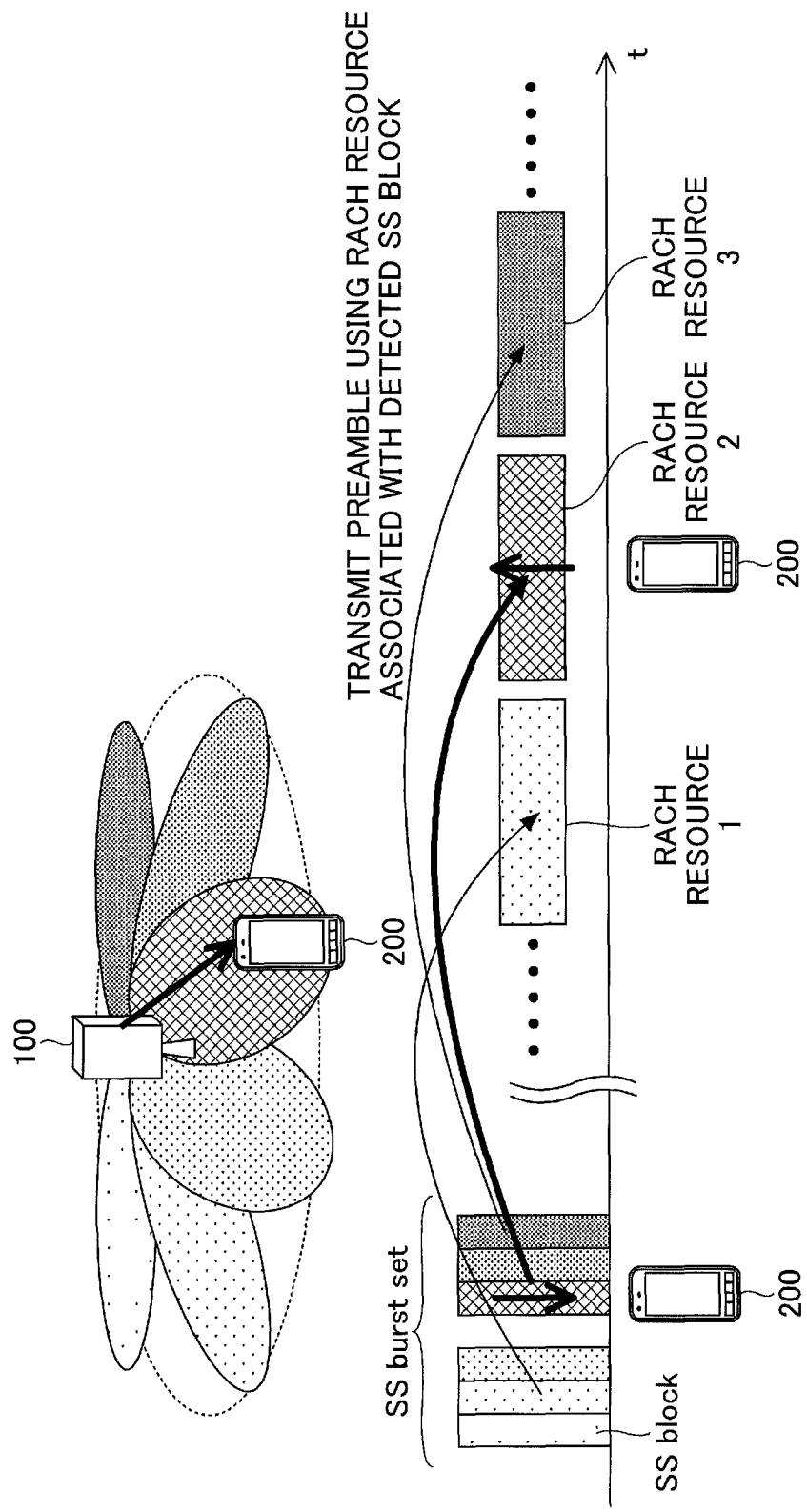
FIG. 3 is a drawing illustrating RACH resources that are associated with SS blocks according to an embodiment of the present invention.

FIG. 3 is a drawing illustrating RACH resources that are associated with SS blocks according to an embodiment of the present invention. As illustrated in FIG. 3, in NR, an SS burst set including the SS blocks associated with beams is transmitted from the base station apparatus 100. The user apparatus 200 receives a detectable SS block, and starts an initial access procedure by transmitting a preamble via a RACH resource that is associated with the received SS block. The RACH resources may be associated with beams.

In an example illustrated in FIG. 3, the user apparatus 200 receives the fourth SS block included in the SS burst set, and transmits a preamble via a RACH resource 2 that is associated with the fourth SS block. Further, in an example illustrated in FIG. 3, the second SS block included in the SS burst set is associated with a RACH resource 1, and the sixth SS block included in the SS burst set is associated with a RACH resource 3. Further, there is an SS block index corresponding to an SS block. For example, the SS block index of the fourth SS block included in the SS burst set is defined as "4".

A method is discussed in which the contention-free random access is performed by using RACH resources illustrated in FIG. 3. In the case where the contention-free random access is started by a handover, a relationship between SS blocks or CSI-RSs and RACH resources may be indicated by a handover command to the user apparatus 200.

With respect to the above, in the case where the contention-free random access is started by a trigger other than the handover, it may be considered that the relationship of the SS blocks or CSI-RSs with RACH resources and/or preamble indexes may be used by the user apparatus 200, which is different from what is used at the time of handover.

Further, in the case where a random access procedure is started by a PDCCH order from a network, if information indicating all of correspondence relationships between the SS blocks or CSI-RSs and RACH resources and/or preamble indexes is included in the PDCCH order to be indicated, signaling overhead will be increased.

Further, in in the contention-free random access at the time of handover, a specific method for specifying the RACH resources is not defined.

Figure 4:
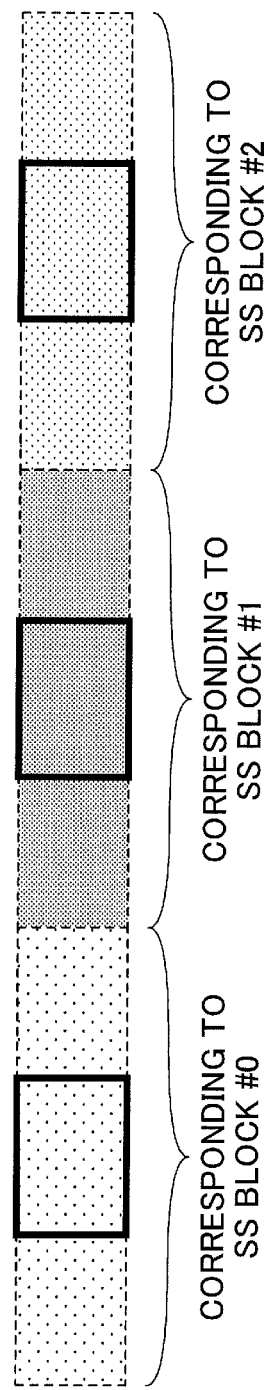
FIG. 4 is a drawing illustrating an example (1) of RACH resources that are associated with SS blocks according to an embodiment of the present invention.
Figure 5:
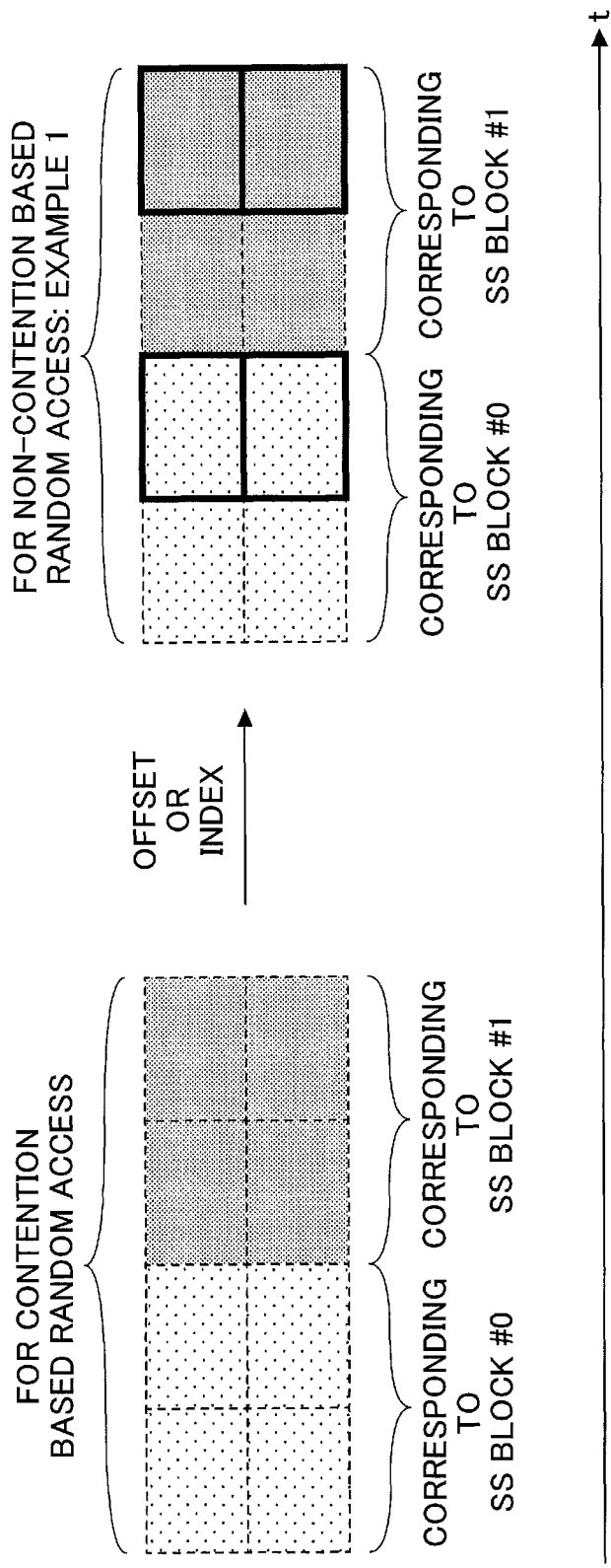
FIG. 5 is a drawing illustrating an example (2) of RACH resources that are associated with SS blocks according to an embodiment of the present invention.
Figure 6:
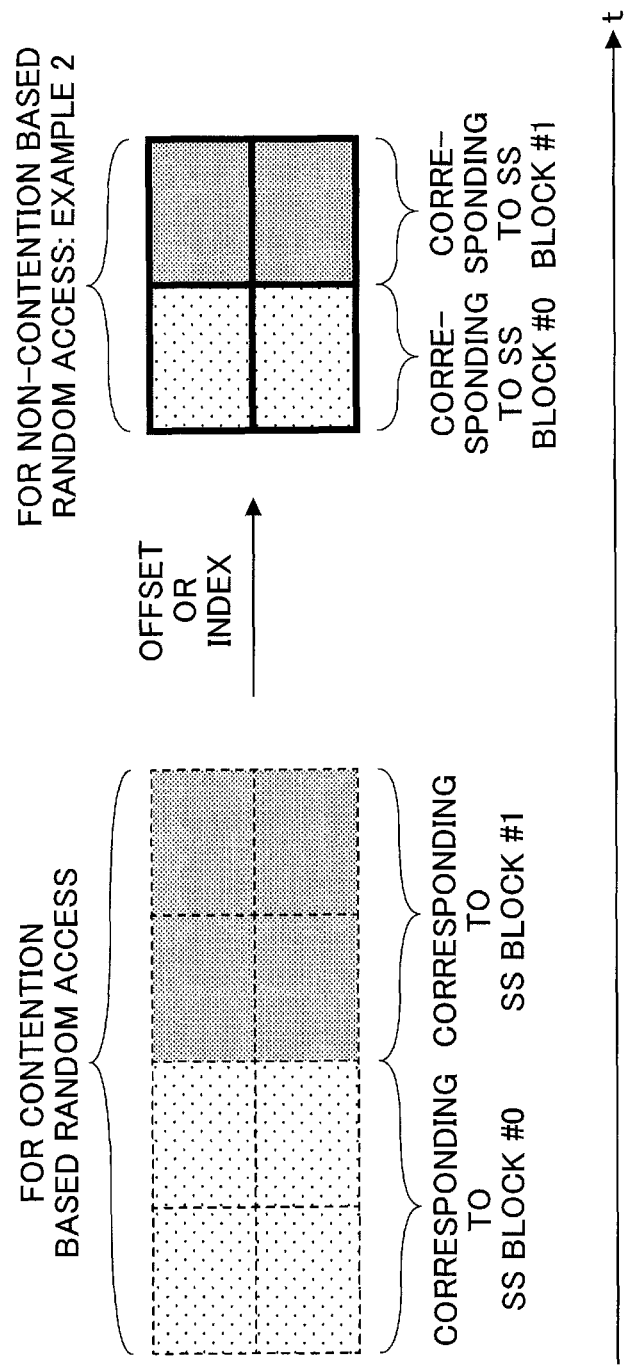
FIG. 6 is a drawing illustrating an example (3) of RACH resources that are associated with SS blocks according to an embodiment of the present invention.

Therefore, the signaling overhead will be reduced by using, as the correspondence relationships between SS blocks and RACH resources and/or preamble indexes for the contention-free random access, a part of the correspondence relationships between the SS blocks and the RACH resources and/or the preamble indexes that have been indicated for contention based random access to the user apparatus 200 via broadcast information, etc. Furthermore, the correspondence relationships between SS blocks and RACH resources and/or preamble indexes may be specified by transmitting additional information to the user apparatus 200 via dedicated signaling, for example, via DCI (Downlink Control Information) of PDCCH order or via RRC (Radio Resource Control) signaling. Referring to FIG. 4, FIG. 5, and FIG. 6, examples of the additional information will be described below.

FIG. 4 is a drawing illustrating an example (1) of RACH resources that are associated with SS blocks according to an embodiment of the present invention.

In the case of performing the contention-free random access, it is necessary to allocate, to the user apparatus 200, at least one of three domains including a position of the RACH resources in the time domain, a position of the RACH resources in the frequency domain, and preamble indexes, which is separated from the RACH resources or preamble indexes used for contention based random access.

In other words, in two domains of the above-described three domains, the RACH resources or the preamble indexes may be shared (in common) between the contention based random access and the contention-free random access.

For example, in the case where the resources are shared between the contention based random access and the contention-free random access in the time domain, a plurality of RACH resources corresponding to an SS block may be configured in the time domain in the contention-based random access. It should be noted that, in the case where all of the plurality of RACH resources in the time domain are allocated for a single instance of contention-free random access, the unused RACH resources will be wasted.

Therefore, a single RACH resource and/or preamble index that is dedicatedly allocated to a user apparatus 200 may be specified from the RACH resources and/or preamble indexes shared by the contention based random access and the contention-free random access. The above-described specification may be indicated by assigning indexes to RACH resources and/or preamble indexes that correspond to each SS block.

FIG. 4 illustrates a case in which three indexes, 0, 1, and 2 are assigned as indexes in the time domain. In each of "corresponding to SS block #0", "corresponding to SS block #1", and "corresponding to SS block #2", a resource in the center frame corresponds to an index 1, a resource on the left side of the center frame corresponds to an index 0, and a resource on the right side of the center frame corresponds to an index 2.

The resources illustrated by the center frames of "corresponding to SS block #0", "corresponding to SS block #1", and "corresponding to SS block #2" in FIG. 4 indicate positions of RACH resources in the time domain in the case where an index 1 is allocated to the user apparatus 200. Based on a detection result, a measurement result, etc., of the SS blocks, the user apparatus 200 selects a resource, from the resources illustrated by the center frames, corresponding to any one of the SS block #0, the SS block #1, and the SS block #2. Further, for example, the resources illustrated on the left side of the center frames may be assigned (allocated) as an index 0 to another user apparatus 200. Even in the case where there are several other user apparatuses 200, it is still possible to perform contention-free random access by further dedicatedly indicating allocations in the frequency domain or the preamble index domain.

Further, an example of assigning indexes for allocating preamble indexes will be described. For example, it is assumed that a total of 64 preamble indexes correspond to two SS blocks by having 32 preamble indexes corresponding to respective SS blocks. SS block #0 corresponds to preamble indexes #0 to #31 and SS block #1 corresponds to preamble indexes #32 to #63. In the case where an index 0 is indicated to the user apparatus 200, the user apparatus 200 may select any one of the preamble index #0 and the preamble index #32 based on the detection result or the measurement result. Further, in the case where an index 12 is indicated to the user apparatus 200, the user apparatus 200 may select any one of the preamble index #12 and the preamble index #44 based on the detection result or the measurement result.

Further, for example, in the case where information amount of: 6 bits for the preamble index; 4 bits for the time domain; and 3 bits for the frequency domain, is used for DCI or RRC signaling, it is possible to control (handle) a case in which allocation is needed for 64 preamble indexes, 14 symbols in a slot in the time domain, and 5 resources in the frequency domain.

Further, for example, indexing may be defined in advance in which the time domain and the frequency domain are integrated to be bit-mapped. For example, when allocating the last twelve (12) symbols in a slot and five (5) resources in the frequency domain, it is possible to indicate 60 indexes using 6 bits. In the case where the time domain and the frequency domain are not integrated, 4 bits are needed for the time domain "12" and 3 bits are needed for the frequency domain "5", which requires a total 7 bits. In other words, it is possible to reduce information amount by 1 bit and the signaling overhead can be reduced by using indexing in which the time domain and the frequency domain are integrated to be bit-mapped.

It should be noted that indexing may be used in which the preamble index domain is also integrated to be bit-mapped.

The above-described information bits used for an indication specifying the time domain, the frequency domain and the preamble index domain are referred to as "resource specifying bits".

In the case where the contention-free random access is realized, it is necessary that at least one of the time domain, the frequency domain, and the preamble index domain is allocated separately from the contention based random access. Therefore, for example, which of the domains is separately allocated may be indicated to the user apparatus 200 according to DCI (PDCCH order), RRC signaling, etc. Alternatively, which of the domains is separately allocated may be defined in advance.

For example, an indication, which indicates that 1) the preamble index domain, 2) the time domain, 3) the frequency domain, 4) the time domain and the frequency domain, etc., will be allocated separately from the resources used for contention based random access, may be transmitted to the user apparatus 200.

A case will be described below in which the preamble indexes are allocated for contention-free random access separately from the contention based random access. In the following, it is assumed that 64 preamble indexes, SS block #0, and SS block #1 are used. For example, it is assumed that the preamble indexes corresponding to SS block #0 for contention based random access are preamble indexes #0 to #23, and the preamble indexes corresponding to SS block #1 for contention based random access are preamble indexes #24 to #47. Here, the preamble indexes #48 to #63 can be used for the preamble indexes for contention-free random access.

It is assumed that the preamble indexes for contention-free random access corresponding to SS block #0 are preamble indexes #48, #50, #52, #56, #58, #60, and #62, and the preamble indexes for contention-free random access corresponding to SS block #1 are preamble indexes #49, #51, #53, #55, #57, #59, #61, and #63. Indexes 0 to 7 are used for indication related to the preamble indexes. When an index 0 is indicated to the user apparatus 200, the user apparatus 200 may select any one of the preamble index #48 corresponding to SS block #0 and the preamble index #49 corresponding to SS block #1 based on a detection result or a measurement result. Further, for example, when an index 3 is indicated to the user apparatus 200, the user apparatus 200 may select any one of the preamble index #54 corresponding to SS block #0 and the preamble index #55 corresponding to SS block #1 based on a detection result or a measurement result.

Further, it is assumed as another method for allocating the indexes to the preamble indexes #48 to #63 that the preamble indexes for contention-free random access corresponding to SS block #0 are preamble indexes #48 to #55, and the preamble indexes for contention-free random access corresponding to SS block #1 are preamble indexes #56 to #63. Indexes 0 to 7 are used for indication related to the preamble indexes. When an index 0 is indicated to the user apparatus 200, the user apparatus 200 may select any one of the preamble index #48 corresponding to SS block #0 and the preamble index #56 corresponding to SS block #1 based on a detection result or a measurement result. Further, for example, when an index 3 is indicated to the user apparatus 200, the user apparatus 200 may select any one of the preamble index #51 corresponding to SS block #0 and the preamble index #59 corresponding to SS block #1 based on a detection result or a measurement result.

Similar to the above example in which the time domain or the preamble index domain is allocated by using the same index for a plurality of SS blocks, the frequency domain may be allocated by using the same index for the plurality of SS blocks.

It should be noted that the resource specifying bits specifying the time domain, the frequency domain, and the preamble index domain may be read to be used as information bits indicating which of the three domains is separately allocated.

FIG. 5 is a drawing illustrating an example (2) of RACH resources that are associated with SS blocks according to an embodiment of the present invention. For example, when allocation separated from contention based random access is performed for contention-free random access in the time domain and the frequency domain, in order to indicate, to the user apparatus 200, resources for contention-free random access: an offset from the resources for contention based random access or the SS blocks may be indicated to the user apparatus 200; a slot index, a symbol index, etc., may be indicated to the user apparatus 200; or the offset, the slot index, the symbol index, etc., may be defined in advance. The resource specifying bits specifying the time domain, the frequency domain, and the preamble index domain may be read to be used as information bits indicating the offset, the slot index, the symbol index, etc. The offset may be specified in the time domain, in the frequency domain, or in the time and frequency domain. The indexes may be applied to the time domain, to the frequency domain, or to the time and frequency domain.

Referring to FIG. 5, an example will be described in which the time domain is separated and allocated for contention-free random access. As illustrated in "for contention-free random access: example 1" in FIG. 5, a resource set may be allocated for contention-free random access, the resource set having the same size as a resource set allocated for contention based random access by specifying the above-described offset or the indexes. With respect to specifying a resource within the resource set allocated for contention-free random access, a resource used by each of the user apparatuses 200 may be specified based on the above-described resource specifying bits. The above-described offset or the indexes may be indicated separately from the above-described resource specifying bits. Further, together with the above-described offset or the indexes, information specifying the size or the domain of the resource set may be transmitted.

In the "contention-free random access: example 1", resources, of the resource set, that are surrounded by solid lines located later in the time domain are resources allocated to a user apparatus 200 corresponding to SS block #0 and SS block #1. Because only the time domain is specified, with respect to the frequency domain, the user apparatus 200 may use any of an upper frequency resource and a lower frequency resource illustrated in FIG. 5.

It should be noted that the resource set is a set of RACH resources and/or preamble indexes set (configured) in the time domain, the frequency domain, and the preamble index domain. The resource set may be configured in three domains, the time domain, the frequency domain, and the preamble index domain, may be configured in any two domains, or may be configured in any one domain.

FIG. 6 is a drawing illustrating an example (3) of RACH resources that are associated with SS blocks according to an embodiment of the present invention.

As illustrated in FIG. 6, a resource set, whose size is different from the resource set allocated for contention based random access, may be allocated for contention-free random access. Similar to FIG. 5, the resource set for contention-free random access may be indicated by: an offset from the resource set allocated for contention based random access; or an index(es).

In "for contention-free random access: example 2", the number of resources corresponding to each of SS blocks in the time domain is one (1). Therefore, in order to specify a resource within the resource set allocated for contention-free random access, it is not necessary to include information for the time domain. Similarly, when the resource set allocated for contention-free random access is configured with respect to the frequency domain or the preamble index domain, in the case where the number of resources corresponding to each of the SS blocks in the frequency domain is one (1) or the number of resources in the preamble index domain is one (1), it is not necessary to include information for the frequency domain or the preamble index domain to specify a resource within the resource set allocated for contention-free random access.

Further, when the resource set allocated for contention-free random access is configured in the preamble index domain, for example, the number of preamble indexes, associated with each SS block, used for contention based random access may be the same as the number of preamble indexes included in the resource set allocated for contention-free random access. In other words, information on the preamble indexes included in the resource set allocated for contention-free random access may not be indicated to the user apparatus 200. For example, in the case where preamble indexes #0 to #15 as the preamble indexes used for contention based random access correspond to SS block #0 and preamble indexes #16 to #31 correspond to SS block #1, it may be defined in advance that preamble indexes #32 to #47 as the preamble indexes included in the resource set allocated for contention-free random access correspond to SS block #0 and preamble indexes #48 to #63 correspond to SS block #1.

Further, for example, an allocation ratio, between SS blocks, of the preamble indexes, associated with SS blocks, used for contention based random access may be the same as an allocation ratio, between SS blocks, of remaining preamble indexes included in the resource set allocated for contention-free random access. In other words, information on the preamble indexes included in the resource set allocated for contention-free random access need not be indicated to the user apparatus 200. For example, in the case where preamble indexes #0 to #23 as the preamble indexes used for contention based random access correspond to SS block #0, and preamble indexes #24 to #47 correspond to SS block #1, the allocation ratio between SS block #0 and SS block #1 is 1:1. Therefore, it may be defined in advance that preamble indexes #48 to #55 as the remaining preamble indexes included in the resource set allocated for contention-free random access correspond to SS block #0 and preamble indexes #56 to #63 correspond to SS block #1.

In the "contention-free random access: example 2", all of the resource set is resources allocated to a user apparatus 200 corresponding to SS block #0 and SS block #1. With respect to the frequency domain, the user apparatus 200 may use any of an upper frequency resource and a lower frequency resource illustrated in FIG. 5.

In the above-described embodiment, when the base station apparatus 100 indicates, to the user apparatus 200, resources used for contention-free random access, it is possible to reduce signaling needed for indication of resources used for contention-free random access by: using a part of correspondence relationships between SS blocks and RACH resources and/or preamble indexes, the relationships being indicated by broadcast information used for contention based random access; and signaling additional information as information dedicated to the user apparatus 200. Further, by allocating the resources used for contention-free random access by separating one of three domains (the time domain, the frequency domain, and the preamble index domain) from the resources used for contention based random access, it is possible to reduce signaling needed for indication of resources used for contention-free random access, and to use the resources of the domains, which have not been separated, for contention based random access.

In other words, it is possible to efficiently indicate, to the user apparatus, resources that are used for contention-free random access in the initial access in a wireless communication system.

Embodiment 2

In the following, an embodiment 2 will be described.

Correspondence relationships, dedicated to the user apparatus 200, between SS blocks and RACH resources and/or preamble indexes may be indicated by RRC signaling. Some of the correspondence relationships may be indicated by information common to all user apparatuses 200 and some of the correspondence relationships may be indicated by information dedicated to each user apparatus 200. By specifying the RACH resources and/or preamble indexes, corresponding to each SS block, dedicated to a user apparatus 200 by using information indicated by RRC signaling, even if the user apparatus 200 selects freely RACH resources and/or preamble indexes corresponding to any SS block based on a detection result or a measurement result of the SS blocks, it is still possible for the user apparatus 200 to perform contention-free random access.

Further, in the case of handover, the contention-free random access may be performed: in addition to using a part or all of the correspondence relationships between the SS blocks and the RACH resources and/or preamble indexes, with the relationships being indicated by a handover command; and using indicated additional information as described in the embodiment 1, with the indicated additional information being indicated by dedicated signaling to the user apparatus 200, for example, by the contents of the handover command, by another RRC signaling, by PDCCH order (DCI), etc. Because the correspondence relationships indicated by the handover command are used, it is possible to reduce signaling overhead related to the SS blocks and the RACH resources and/or preamble indexes. Similar to using the handover command, the contention-free random access may be performed by using some indication that includes correspondence relationships between the SS blocks and the RACH resources and/or preamble indexes via RRC signaling, and by indicating additional information described in the embodiment 1.

In the above-described embodiment 2, when indicating the resources used for contention-free random access to the user apparatus 200, it is possible for the base station apparatus 100 to explicitly indicate the correspondence relationships between the SS blocks and the RACH resources and/or preamble indexes. Further, when indicating the resources used for contention-free random access to the user apparatus 200, it is possible for the base station apparatus 100 to reduce signaling related to indication of resources used for contention-free random access by using predefined correspondence relationships between the SS blocks and the RACH resources and/or preamble indexes.

(Apparatus Structure)

Next, examples of functional structures of the base station apparatus 100 and the user apparatus 200 that perform the processes and operations described above will be described. The base station apparatus 100 and the user apparatus 200 each have at least functions for performing an embodiment of the present invention. It should be noted that the base station apparatus 100 and the user apparatus 200 each may have only a part of the functions for performing an embodiment of the present invention.

Figure 7:
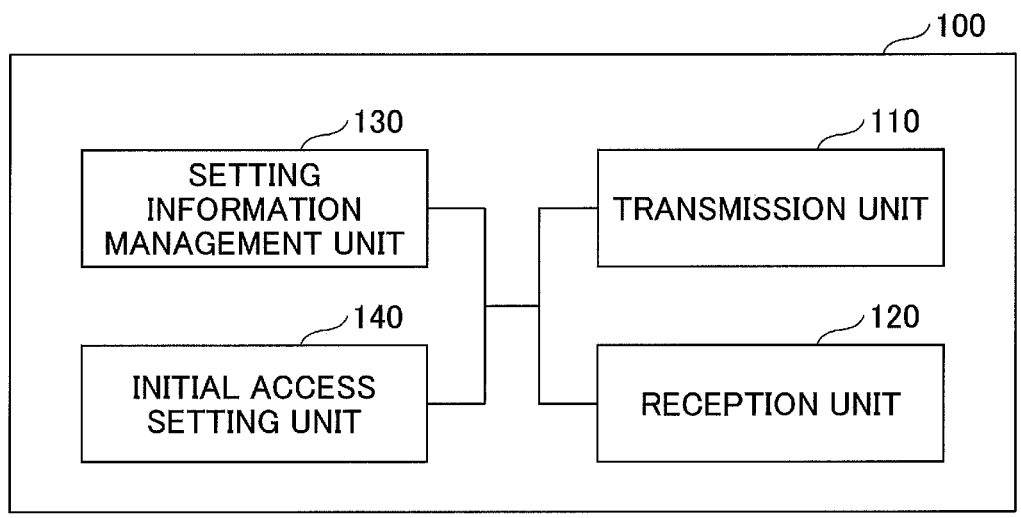
FIG. 7 is drawing illustrating an example of a functional structure of a base station apparatus 100 according to an embodiment of the present invention.

FIG. 7 is a drawing illustrating an example of a functional structure of a base station apparatus 100. As illustrated in FIG. 7, the base station apparatus 100 includes a transmission unit 110, a reception unit 120, a configuration (setting) information management unit 130, and an initial access setting (configuration) unit 140. The functional structure illustrated in FIG. 7 is merely an example. Functional divisions and names of functional units may be anything as long as it can perform operations according to an embodiment of the present invention.

The transmission unit 110 has a function for generating a signal to be transmitted to the user apparatus 200 and for transmitting the signal wirelessly. The reception unit 120 has a function for receiving various signals transmitted from the user apparatus 200 and for obtaining, for example, upper layer information from the received signals. Further, the transmission unit 110 has a function for transmitting to the user apparatus 200 NR-PSS, NR-SSS, NR-PBCH, DL/UL control signals, etc. Further, the transmission unit 110 transmits to the user apparatus 200 information related to transmission power control and information related to scheduling, and the reception unit 120 receives from the user apparatus 200 a message related to a preamble and initial access.

The setting information management unit 130 stores preset setting information and various setting information items to be transmitted to the user apparatus 200. Contents of the setting information are, for example, information to be used for initial access, etc.

The initial access setting unit 140 controls transmission of a synchronization signal from the base station apparatus 100 to the user apparatus 200 and transmission of system information including information used for initial access. The initial access information setting unit 140 also controls initial access from the user apparatus 200.

Figure 8:
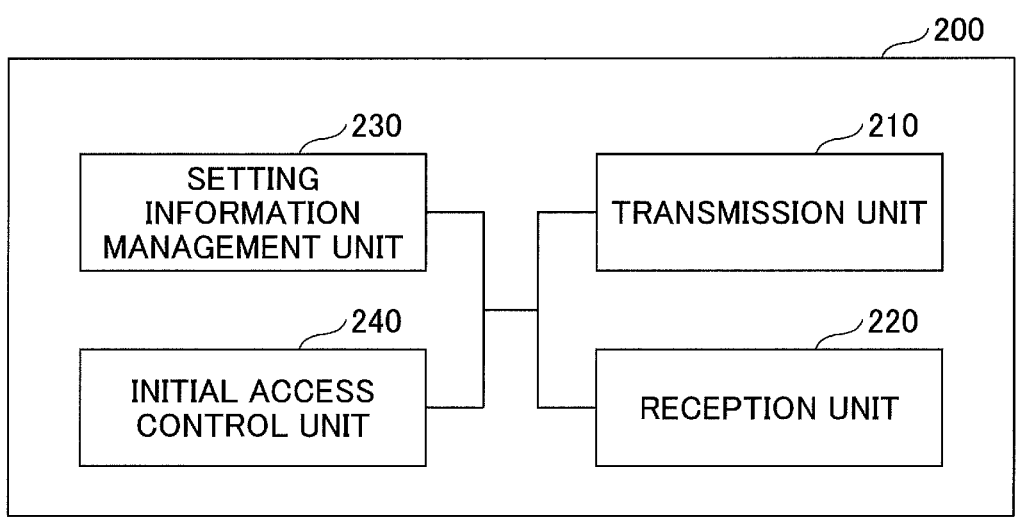
FIG. 8 is drawing illustrating an example of a functional structure of a user apparatus 200 according to an embodiment of the present invention.

FIG. 8 is a drawing illustrating an example of a functional structure of a user apparatus 200. As illustrated in FIG. 8, the user apparatus 200 includes a transmission unit 210, a reception unit 220, a setting information management unit 230, and an initial access control unit 240. The functional structure illustrated in FIG. 8 is merely an example. Functional divisions and names of functional units may be anything as long as it can perform operations according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL control signals, etc., transmitted from the base station apparatus 100. Further, the transmission unit 210 transmits to the base station apparatus 100 a message related to a preamble and initial access, and the reception unit 220 receives from the base station apparatus 100 information to be used for initial access.

The setting information management unit 230 stores various setting information items received by the reception unit 220 from the base station apparatus 100. Further, the setting information management unit 230 also stores preset setting information. Contents of the setting information are, for example, information to be used for initial access, etc.

The initial access control unit 240 controls initial access of the user apparatus 200 described in an embodiment of the present invention. It should be noted that the functional units related to preamble signal transmission, etc., in the initial access control unit 240 may be included in the transmission unit 210, and the functional units related to system information reception, etc., in the initial access control unit 240 may be included in the reception unit 220.

(Hardware Structure)

In the above functional structure diagrams used for describing an embodiment of the present invention (FIG. 7 and FIG. 8), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless).

Figure 9:
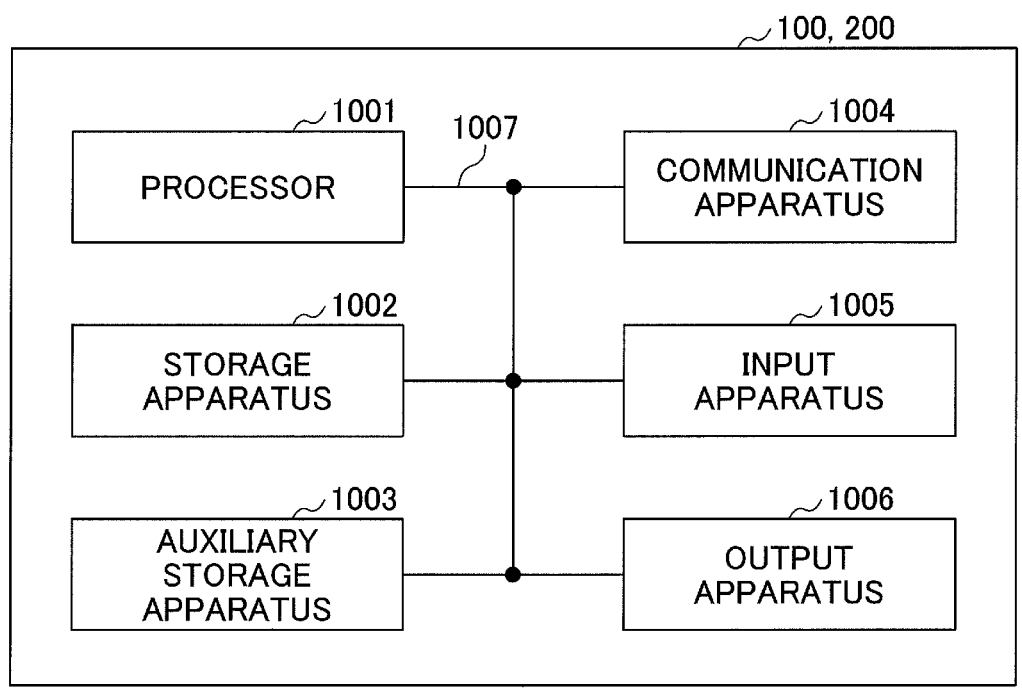
FIG. 9 is a drawing illustrating examples of hardware structures of the base station apparatus 100 and the user apparatus 200.

Further, for example, a base station apparatus 100 and a user apparatus 200 according to an embodiment of the present invention may function as computers that perform processes according to an embodiment of the present invention. FIG. 9 is a drawing illustrating an example of a hardware structure of a wireless communication apparatus that is a base station apparatus 100 or a user apparatus 200 according to an embodiment of the present invention. Each of the base station apparatus 100 and the user apparatus 200 may be physically a computer apparatus including a processor 1001, a storage apparatus 1002, an auxiliary storage apparatus 1003, a communication apparatus 1004, an input apparatus 1005, an output apparatus 1006, a bus 1007, etc.

It should be noted that, in the descriptions below, the term "apparatus" can be read as a circuit, a device, a unit, etc. The hardware structures of the base station apparatus 100 and the user apparatus 200 may include one or more of each of the apparatuses indicated by 1001 to 1006 illustrated in the figure, or may not include some apparatuses.

Each of the functions of the base station apparatus 100 and the user apparatus 200 is realized by causing predetermined software (program) to be read by hardware such as the processor 1001, the storage apparatus 1002, or the like, by causing the processor 1001 to perform calculations, and by causing the processor 1001 to control communications by the communication apparatus 1004, and to control reading and/or writing data by the storage apparatus 1002 and the auxiliary storage apparatus 1003.

The processor 1001 controls the entire computer by, for example, controlling the operating system. The processor 1001 may include a central processing unit (CPU) including an interface with a peripheral apparatus, a control apparatus, a calculation apparatus, a register, etc.

Further, the processor 1001 reads a program (program code), a software module, or data from the auxiliary storage apparatus 1003 and/or the communication apparatus 1004, writes the program, the software module, or the data to the storage apparatus 1002, and performs various processes according to the program, the software module, or the data. As the program, a program is used that causes the computer to perform at least a part of operations according to an embodiment of the present invention described above. For example, the transmission unit 110, the reception unit 120, the setting information management unit 130, and the initial access setting unit 140 of the base station apparatus 100 illustrated in FIG. 7 may be realized by control programs that are stored in the storage apparatus 1002 and are executed by the processor 1001. Further, for example, the transmission unit 210, the reception unit 220, the setting information management unit 230, and the initial access control unit 240 of the user apparatus 200 illustrated in FIG. 8 may be realized by control programs that are stored in the storage apparatus 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage apparatus 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage apparatus 1002 may be referred to as a register, a cache, a main memory, etc. The storage apparatus 1002 is enabled to store programs (program codes), software modules, or the like, that are executable for performing processes according to an embodiment of the present invention.

The auxiliary storage apparatus 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The auxiliary storage apparatus 1003 may be referred to as an auxiliary storage apparatus. The above recording medium may be a database including the storage apparatus 1002 and/or the auxiliary storage apparatus 1003, a server, or any other appropriate medium.

The communication apparatus 1004 is hardware (transmission and reception device) for communicating with computers via a wired and/or wireless network, and may be referred to as a network device, a network controller, a network card, a communication module, etc. For example, the transmission unit 110 and the reception unit 120 of the base station apparatus 100 may be realized by the communication apparatus 1004. Further, the transmission unit 210 and the reception unit 220 of the user apparatus 200 may be realized by the communication apparatus 1004.

The input apparatus 1005 is an input device that receives an external input (e.g., keyboard, mouse, microphone, switch, button, sensor). The output apparatus 1006 is an output device that outputs something to the outside (e.g., display, speaker, LED lamp). It should be noted that the input apparatus 1005 and the output apparatus 1006 may be integrated into a single apparatus (e.g., touch panel).

Further, the apparatuses including the processor 1001, the storage apparatus 1002, etc., are connected to each other via the bus 1007 used for communicating information. The bus 1007 may include a single bus, or may include different buses between the apparatuses.

Further, each of the base station apparatus 100 and the user apparatus 200 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to one or more embodiments of the present invention, provided is a user apparatus that communicates with a base station apparatus. The user apparatus includes a reception unit configured to receive, from the base station apparatus, a plurality of blocks and an indication including information specifying a part of resources used for contention-free random access, a control unit configured to identify resources used for contention-free random access based on information specifying resources that are associated with the blocks and are used for random access, and based on the information specifying a part of resources used for contention-free random access, and a transmission unit configured to transmit a preamble to the base station apparatus using the identified resources used for contention-free random access.

According to the above arrangement, it is possible to efficiently indicate, to the user apparatus, resources used for contention-free random access in an initial access of a wireless communication system by specifying resources used for contention-free random access by using information specifying resources, associated with the blocks, used for random access.

The resources that are associated with the blocks and are used for random access may be resources that are used for contention based random access based on broadcast information, resources that are specified based on a handover command, or resources that are specified based on dedicated signaling for the user apparatus. With the above arrangement, it is possible to reduce signaling overhead by specifying resources used for contention-free random access by using information specifying resources that are associated with the blocks and are used for random access according to broadcast information, a handover command, or dedicated signaling.

The information specifying a part of resources used for contention-free random access may be information that specifies at least one of a time domain, a frequency domain, and a preamble index (domain). With the above arrangement, signaling overhead is reduced and RACH resources are effectively utilized by separating at least one of the time domain, the frequency domain, and the preamble index domain of the resources used for contention-free random access from the resources used for contention based random access.

The information that specifies at least one of a time domain, a frequency domain, and a preamble index domain includes common indexes that are common among the blocks, and the time domain, the frequency domain, or the preamble index domain that is associated with each of the blocks may be specified based on the corresponding common index. With the above arrangement, by using the common indexes, it is possible to reduce the signaling overhead, and it is possible for the user apparatus to select a good-reception-condition SS block of the SS blocks to perform contention-free random access.

The resources that are associated with the blocks and are used for random access are a set of resources that includes a plurality of resources that are used for contention based random access, and the information specifying a part of resources used for contention-free random access may include an offset from the set of resources in a time domain or in a frequency domain and information that specifies a size of a set of resources used for contention-free random access. With the above arrangement, it is possible to reduce signaling overhead by indicating, to the user apparatus, a set of resources used for contention-free random access.

Further, according to one or more embodiments of the present invention, provided is a base station apparatus that communicates with a user apparatus. The base station apparatus includes a setting unit configured to generate an indication including information specifying a part of resources used for contention-free random access, a transmission unit configured to transmit, to the user apparatus, a plurality of blocks and an indication including information specifying a part of resources used for the contention-free random access, and a reception unit configured to receive a preamble from the user apparatus via resources used for contention-free random access that are specified from: information specifying resources that are associated with the blocks and are used for random access; and the information specifying a part of the resources used for contention-free random access.

According to the above arrangement, it is possible to efficiently indicate, to the user apparatus, resources used for contention-free random access in an initial access of a wireless communication system by specifying resources used for contention-free random access by using information specifying resources, associated with the blocks, used for random access.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a user apparatus UE, or a base station eNB has been described by using functional block diagrams. However, the apparatuses may be realized by hardware, software, or a combination of hardware and software. The software executed by a processor included in a user apparatus UE according to an embodiment of the present invention and the software executed by a processor included in a base station eNB according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

The order of processing steps, sequences or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 100 in the present specification, may be performed by an upper node in some cases. In a network including one or more network nodes including a base station apparatus 100, it is apparent that various operations performed for communicating with a user apparatus 200 may be performed by the base station apparatus 100 and/or another network node other than the base station apparatus 100 (for example, but not limited to, MME or S-GW). According to the above, a case is described in which there is a single network node other than the base station apparatus 100. However, a combination of multiple other network nodes may be considered (e.g., MME and S-GW).

An aspect/embodiment described in the present specification may be used independently, may be used in combination, or may be used by switching according to operations.

There is a case in which the user apparatus 200 may be referred to, by a person skilled in the arte, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

There is a case in which the base station apparatus 100 may be referred to, by a person skilled in the art, as a NB (NodeB), an eNB (enhanced NodeB), a gNB, a base station, or some other appropriate terms.

As used herein, the term "determining" may encompasses a wide variety of actions. The "determining" may include, for example, a case in which "judging", "calculating", "computing", "processing", "deriving", "investigating", "looking up" (e.g., looking up a table, database, or other data structures), or "ascertaining" is deemed as "determining". Also, "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining".

The description "based on" used in the present specification does not mean "based on only" unless otherwise specifically noted. In other words, the phrase "base on" means both "based on only" and "based on at least".

When the terms "include", "including", and variations thereof are used in the present specification or in the claims, the terms are intended to be non-restrictive (to be considered "open terminology") the same as the term "comprising". Further, the term "or" used in the present specification or in the claims is intended to be not an "exclusive or".

Throughout the present specification, in the case where articles "a", "an", and "the" are added to a noun as a result of translation, unless otherwise indicated, the noun may be plural.

It should be noted that the SS blocks are examples of the blocks in an embodiment of the present invention. RACH resources and/or preamble indexes are examples of resources. The initial access setting unit 140 is an example of a setting unit. The initial access control unit 240 is an example of a control unit.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. In other words, the descriptions of the present specification are for illustrative purposes only, and are not intended to be limitations to the present invention.

DESCRIPTION OF THE REFERENCE NUMERALS

100 Base station apparatus
200 User apparatus
110 Transmission unit
120 Reception unit
130 Setting information management unit
140 Initial access setting unit
200 User apparatus
210 Transmission unit
220 Reception unit
230 Setting information management unit
240 Initial access control unit
1001 Processor
1002 Storage apparatus
1003 Auxiliary storage apparatus
1004 Communication apparatus
1005 Input apparatus
1006 Output apparatus

What is claimed is:

1. A terminal comprising:
a receiver configured to receive, from a base station apparatus,
an indication including information indicating resources for contention-free random access, and
one or more synchronization signal blocks;
a processor configured to identify resources for contention-free random access based on the information indicating resources for contention-free random access; and information related to association between the one or more synchronization signal blocks and resources for random access; and
a transmitter configured to transmit a random access preamble to the base station apparatus using the identified resources for contention-free random access, wherein
the information related to association between the one or more synchronization signal blocks and resources for random access indicates resources for random access available for the terminal, the resources for random access available for the terminal including the resources associated with the one or more synchronization signal blocks,
each synchronization signal block of the one or more synchronization signal blocks is associated with the resources for random access available for the terminal, and
the information indicating the resources for contention-free random access indicates information indicating the resources for contention-free random access used for transmission of the random access preamble, from among the resources for random access associated with each synchronization signal block.

2. The terminal according to claim 1, wherein the resources for contention-free random access are identified from among resources indicated by the information related to association between the one or more synchronization signal blocks and resources for random access, based on the information indicating the resources for contention-free random access.

3. The terminal according to claim 1, wherein the information indicating the resources for contention-free random access indicates positions, in a time domain and a frequency domain, of resources for contention-free random access used for transmission of the random access preamble.

4. The terminal according to claim 1, wherein the receiver receives the indication via at least one of Radio Resource Control, RRC signaling and Physical Downlink Control Channel, PDCCH.

5. The terminal according to claim 1, wherein the processor selects a synchronization signal block based on a measurement result using the one or more synchronization signal blocks, and identifies resources for contention-free random access associated with the selected synchronization signal block.

6. The terminal according to claim 1, wherein the information related to association between the one or more synchronization signal blocks and resources for random access is information related to association between the one or more synchronization signal blocks and resources for contention-free random access based on broadcast information.

7. The terminal according to claim 1, wherein
the processor selects the random access preamble based on: information indicating a random access preamble for contention-free random access included in the indication; and the one or more synchronization signal blocks, and
the transmitter transmits the selected random access preamble to the base station apparatus.

8. A communication method of a terminal, comprising:
receiving, from a base station apparatus, an indication including information indicating resources for contention-free random access;
receiving, from the base station apparatus, one or more synchronization signal blocks;
identifying resources for contention-free random access based on
information related to association between the one or more synchronization signal blocks and resources for random access, and
information indicating the resources for contention-free random access; and
transmitting a random access preamble to the base station apparatus using the identified resources for contention-free random access, wherein
the information related to association between the one or more synchronization signal blocks and resources for random access indicates resources for random access available for the terminal, the resources for random access available for the terminal including the resources associated with the one or more synchronization signal blocks,
each synchronization signal block of the one or more synchronization signal blocks is associated with the resources for random access available for the terminal, and
the information indicating the resources for contention-free random access indicates information indicating the resources for contention-free random access used for transmission of the random access preamble, from among the resources for random access associated with each synchronization signal block.

9. A base station apparatus comprising:
a processor configured to determine
information related to resources for random access associated with one or more synchronization signal blocks, and
information indicating resources for contention-free random access;
a transmitter configured to transmit, to a terminal,
an indication including the information indicating the resources for contention-free random access, and
the one or more synchronization signal blocks; and
a receiver configured to receive, from the terminal, a random access preamble based on
the indication including information indicating the resources for contention-free random access, and
information related to association between the one or more synchronization signal blocks and resources for random access, wherein
the information related to association between the one or more synchronization signal blocks and resources for random access indicates resources for random access available for the terminal, the resources for random access available for the terminal including the resources associated with the one or more synchronization signal blocks,
each synchronization signal block of the one or more synchronization signal blocks is associated with the resources for random access available for the terminal, and
the information indicating the resources for contention-free random access indicates information indicating the resources for contention-free random access used for transmission of the random access preamble from among the resources for random access associated with each synchronization signal block.

* * * * *